Sept. 17, 1963     D. E. NIELSEN ETAL     3,104,134
NON-ROTATING DRILL GUIDE ASSEMBLY
Filed May 5, 1961
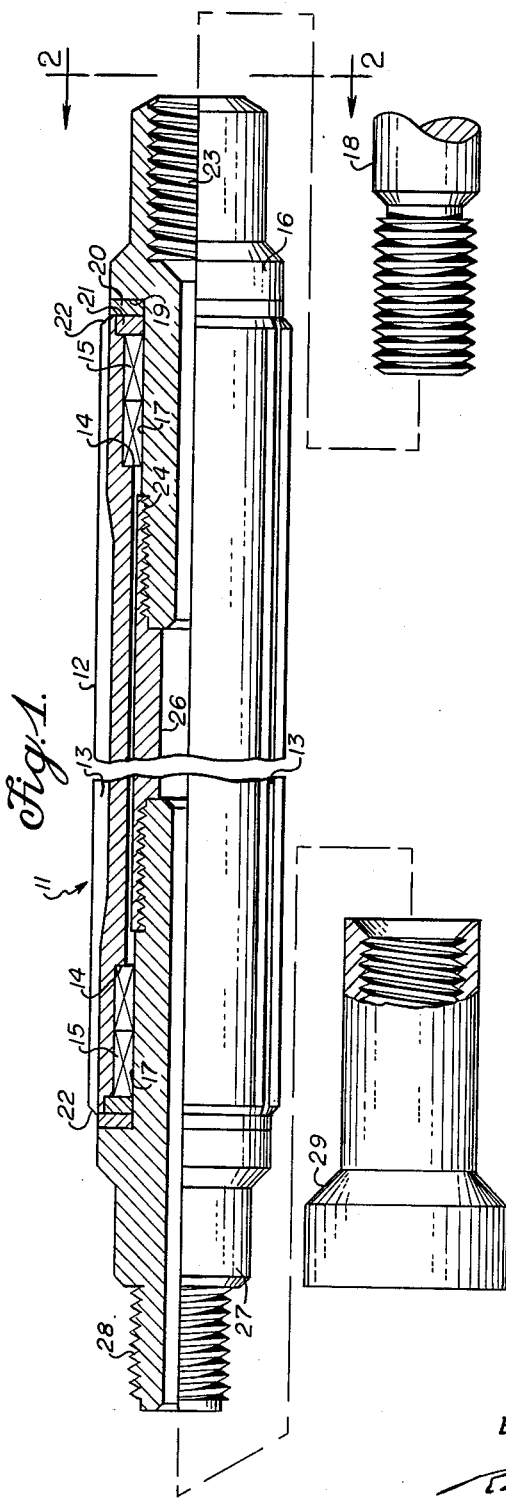
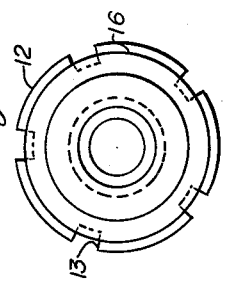
INVENTORS
DALE E. NIELSEN
JAMES L. OLSEN
WALTER P. BENNETT
BY
*Roland A. Anderson*
ATTORNEY 3,104,134
NON-ROTATING DRILL GUIDE ASSEMBLY
Dale E. Nielsen, Livermore, Calif., and James L. Olsen and Walter P. Bennett, Las Vegas, Nev., assignors to the United States of America as represented by the United States Atomic Energy Commission
Filed May 5, 1961, Ser. No. 108,213
1 Claim. (Cl. 308—4)

The present invention relates to directional hole drilling and, in particular, to the drilling of straight, horizontal holes for use in diagnostic measurements conducted in the field of underground nuclear explosive research.

In recent years, extensive studies have been conducted to ascertain the effects, results, and possible applications of underground nuclear explosions; such studies as, for example, those connected with the Rainier event conducted at the Nevada test site. To obtain information necessary for furthering the knowledge concerning such underground explosions and their possible industrial and scientific applications, extensive tests and diagnostic measurements must be taken before, during, and after the occurring nuclear event. Prominent among such measurements are those obtained through the use of line-of-sight holes drilled from points of vantage into the point of detonation. Such line-of-sight holes are mainly used for the gathering of information concerning gamma ray and neutron radiation. Since gamma rays and neutrons travel essentially in straight lines, it is necessary that such line-of-sight holes be extremely straight to present to the radiation detection apparatus the best possible view of the occurring explosion.

In the past, such line-of-sight holes have been drilled by conventional drilling apparatus well-known in the field of oil well drilling; such apparatus being adapted in this particular application to drill horizontal holes. Such drilling apparatus employs conventional drill collars disposed immediately behind the drill bit. These drill collars are slightly under drill bit size and are constructed with thick, rigid walls, thereby providing a substantially straight hole for approximately the first sixty feet thereof. As the length of the drilled hole increases beyond sixty feet, the drill collars no longer provide the necessary bit support and the bit veers off in a direction determined by rotation, by gravity, and by the substrata formation characteristics through which it is passing. In an attempt to prevent such drill bit wandering, a series of specially constructed full-hole-size drill collars were then employed. A "full-hole" device features an outer diameter slightly smaller than the bit diameter to thereby provide a stabilizing effect thereon. Such series of collars increased the depth of penetration obtainable before the aforementioned drill bit wandering occurs, but because of the extensive friction or drag surface of the rotating drill collars bearing against the walls of the drilled hole, excessive amounts of power are needed to rotate the bit. Furthermore, the weight of the heavy-walled drill collars, combined with the rotation thereof, tended to oval the hole as it was being drilled, which also eliminates the advantages of the "full-hole" feature.

To overcome the foregoing limitations imposed by conventional drilling methods, the present invention provides a full hole guide assembly which is located in operation immediately behind a standard drill bit. The guide assembly comprises, briefly, an outer hollow tube with a plurality of grooves machined into the surface and along the axial length thereof to provide for passage of circulating fluids. The outer tube is mounted in rotatable relation to an inner tube, the latter connecting the drill bit to the drill stem. The outer tube thus provides a non-rotating surface which bears against the drill hole to provide the necessary support for the drill bit. Therefore, the invention is relatively light weight and offers more rigidity and bit guiding qualities than the heavy drill collars of previous mention, while simultaneously providing the advantage of no rotation thereof with respect to the drilled bore hole.

Therefore, it is an object of the present invention to provide a drill guide to replace or supplement a conventional drill collar when drilling highly accurate line-of-sight holes.

It is another object of the present invention to provide a non-rotating full hole guide which will not oval the drilled hole due to rotation therein.

It is a further object of the present invention to provide a full hole guide which exhibits minor rotational friction characteristics with respect to the bore hole.

It is yet another object of the present invention to provide an accurate guide means for drilling straight, horizontally oriented holes for line-of-sight underground explosive studies.

Other objects and advantages will be apparent in the following description and claim considered together with the accompanying drawing, in which:

FIGURE 1 is a partial cross-sectional view of a preferred embodiment of the present invention, and FIGURE 2 is a sectional view taken along line 2—2 of FIGURE 1.

Referring now to the drawing, there is shown a non-rotating guide assembly 11 comprising an outer hollow tube 12, preferably constructed of a light weight metal such as aluminum, the outer surface thereof having a plurality of equally spaced flutes 13 extending the length thereof to allow for conventional circulation of drilling fluid between the tube assembly 11 and the confining bore hole wall. As shown in the drawing, the tube 12 has a remaining outer surface area which is greater than the area removed upon forming the flutes 13 therein. The inside surface of each end of the tube 12 is machined to a larger diameter to provide a shoulder 14 for retaining one or more needle bearings 15 therein. A hollow, threaded adapter 16 is machined to provide a bearing surface 17 upon which to mount the respective bearings 15. Such adapter 16 further provides the means for connecting a conventional drill stem 18 to the guide assembly 11 for the purpose of providing rotation thereto. A shoulder 19 disposed at the upper end of the surface 17 of adapter 16 retains a thrust washer 20 which, in turn, retains an oil seal 21 for preventing entrance of foreign matter such as sand thereto, and for maintaining lubrication of the bearings 15. Tube 12 is provided with beveled shoulders 22 at its upper and lower ends to reduce binding thereof to a minimum when traveling in and out of the drill hole.

Inside screw threads 23 provide means for coupling the adapter 16 to the drill stem 18 for delivering rotation thereto. Outside screw threads 24, at the opposite end of adapter 16, screw into matching screw threads on one end of an inner connecting tube 26. Such connecting tube 26 extends concentrically within the outer tube 12 to thread at its other end to a hollow barrel adapter 27. The adapter 27 is similar to the adapter 16 in that it provides a bearing mounting surface and seal means for bearings identical to bearings 15 such as hereinbefore described with respect to adapter 16. The adapter 27 has an outside screw thread 28 for coupling the non-rotating guide assembly 11 to either a conventional core barrel and attached drill bit, or directly to a conventional drill bit 29 with the necessary coupling connector therebetween. Therefore, the rotating force applied to the drill stem 18 by the drilling rig is transmitted through the guide assembly 11 to the drill bit 29. It is to be noted that adapter 27 may have the outside threads 28 as shown or inside threads, depending upon the application desired. Although the guide assembly 11 has herein been disclosed as singular, it is further realized that a number of such assemblies may be utilized together in a drill string.

In operation, the present invention is assembled with the desired drill bit attached to adapter 27 and the drill stem for providing rotation coupled to adapter 16. It is to be noted that the outer diameter of non-rotating outer tube 12 is of full hole size. That is, the tube outer diameter is equal to the drill bit outer diameter. The snug fit provided by the present invention within the bore hole prevents the drill bit from wandering due to the characteristics of the formation through which the bit is passing. Furthermore, drill stem rotational friction drag is reduced since tube 12 does not rotate with respect to the bore hole. Instead, tube 12 lies stationary within the bore hole and the adapter 16, tube 26, and adapter 27 rotate therewithin to transmit the rotation of the drill stem 18 to the drill bit 29.

As is well-known in the art, drilling fluid is conventionally circulated down through the hollow drill stem and guide assembly, through jets in the bit, and back up the annular space between the bit and the bore hole wall for several reasons; e.g., to remove bit cuttings, cool the bit, plaster the bore hole wall, etc. Since the present invention is full hole size and, therefore, would not allow for such circulation along the annular passage, the plurality of flutes 13 are provided along the length of the outer surface of the outer tube 12 for return passage of the drilling fluid.

While the present invention has been disclosed herein with respect to a single preferred embodiment, it will be apparent that numerous variations and modifications may be made within the spirit and scope of the invention and, thus, it is not intended to limit the invention except by the terms of the following claim.

What is claimed is:

A drill guide assembly for use with a conventional hole drilling rig including a drill stem and drill bit comprising an outer cylindrical tube having a plurality of flutes extending the length of the outer surface thereof, said tube having an outside diameter substantially equal to the drill hole diameter, said tube further having an outer surface area greater than the area removed by the forming of said flutes, an inner connecting tube disposed concentrically within said outer tube, a first tubular adapter threadably attached to one end of said inner tube and adapted for connection to said drill stem, a second tubular adapter threadably attached to the other end of said inner tube and adapted for connection to said drill bit, said first and second adapters respectively having cylindrical machined surfaces along their central lengths terminating in shoulders at their outer ends, a first bearing means including a seal disposed to bear upon the machined surface and against the shoulder of said first adapter, and a second bearing means including a seal disposed to bear upon the machined surface and against the shoulder of said second adapter whereby said first and second bearing means provide a low friction axis for rotation of said outer tube thereabout.

References Cited in the file of this patent
UNITED STATES PATENTS

| | | |
|---|---|---|
| 790,330 | Terry | May 23, 1905 |
| 1,773,231 | Lawrence | Aug. 19, 1930 |
| 2,072,320 | Thomas | Mar. 2, 1937 |
| 2,481,430 | Koller | Sept. 6, 1949 |